US009205402B1

(12) United States Patent
Fernandes et al.

(10) Patent No.: US 9,205,402 B1
(45) Date of Patent: Dec. 8, 2015

(54) OZONE CONVERTER FOR AN AIRCRAFT

(71) Applicant: RSA Engineered Products, LLC, Simi Valley, CA (US)

(72) Inventors: Leslie Fernandes, La Canada, CA (US); Arnaud Amy, Studio City, CA (US)

(73) Assignee: RSA Engineered Products, LLC, Simi Valley, CA (US)

( * ) Notice: Subject to any disclaimer, the term of this patent is extended or adjusted under 35 U.S.C. 154(b) by 0 days.

(21) Appl. No.: 14/729,424

(22) Filed: Jun. 3, 2015

(51) Int. Cl.

| | |
|---|---|
| ***B01J 19/24*** | (2006.01) |
| ***B64D 13/06*** | (2006.01) |
| ***C01B 13/02*** | (2006.01) |

(52) U.S. Cl.
CPC ................. *B01J 19/24* (2013.01); *B64D 13/06* (2013.01); *C01B 13/0203* (2013.01); *B01J 2219/24* (2013.01)

(58) Field of Classification Search
CPC ...... B01J 19/24; B64D 13/06; C01B 13/0203
USPC .......................................................... 422/122
See application file for complete search history.

(56) References Cited

U.S. PATENT DOCUMENTS

| | | | | |
|---|---|---|---|---|
| 4,348,360 | A | 9/1982 | Chang et al. | |
| 6,214,303 | B1 | 4/2001 | Hoke et al. | |
| 7,152,635 | B2 | 12/2006 | Moravec et al. | |
| 7,306,644 | B2 | 12/2007 | Leigh et al. | |
| 9,133,028 | B2 * | 9/2015 | Army | C01B 13/0203 |
| 2002/0074174 | A1 | 6/2002 | Dettling et al. | |
| 2010/0021360 | A1 | 1/2010 | Leenders et al. | |
| 2013/0156670 | A1 | 6/2013 | Galligan et al. | |
| 2013/0230436 | A1 | 9/2013 | Vestal et al. | |

* cited by examiner

*Primary Examiner* — Sean E Conley
(74) *Attorney, Agent, or Firm* — Fulwider Patton LLP

(57) ABSTRACT

A system for removing oxygen molecules and ozone molecules from an airstream includes a dual core ozone converter having a first core and a second core separated by a gap G, and an air separation module for extracting oxygen molecules (O2) from the airstream, wherein the dual core ozone converter increases the oxygen concentration by removing the ozone present in the airstream, and the air separation module extracts the oxygen from the airflow exiting the dual core ozone converter.

5 Claims, 3 Drawing Sheets

90
92
90
92
26
G
28

OZONE CONVERTER FOR AN AIRCRAFT

BACKGROUND

The higher altitudes at which modern aircraft operate provide numerous advantages over lower flight plans. There are generally fewer clouds and less turbulence at high altitudes, and thus passengers are subjected to smoother flights. Aircraft engines are also optimized for high altitudes, so fuel efficiency is another benefit of operation at a higher altitude. Because the air is thinner, the aircraft meets with less resistance and the plane gets more lift with less thrust, improving fuel efficiency. Because the air is thinner and there is less moisture, there is less accumulation of ice at high altitudes as well.

For these reasons, aircraft have been flying at higher altitudes to reduce fuel consumption and enjoy the benefits of less weather and turbulence. However, one downside to flying at higher elevations is the presence of ozone, a highly flammable oxygen molecule found at higher concentrations in the upper atmosphere, and its potentially harmful effects. At higher elevations, the ambient $O_3$ concentration becomes an unavoidable contaminant in both the cabin and the fuel system. Ozone enters the aircraft at high elevations through the air conditioning system or other venting orifices. Once onboard, ozone in the cabin causes numerous physical ailments to passengers and crew, including fatigue, headaches, shortness of breath, nausea (air sickness), sinus irritation, and in certain susceptible passengers, chest pains and pulmonary distress. Because of these adverse health effects, the Federal Aviation Administration (FAA) set limits for ozone content in passenger aircraft cabins. According to FAA AC-120-38, ozone must be less than 0.25 parts per million by volume (ppmv) at any given instant above 32,000 feet (FL-320). Above 27,000 feet (FL-270) for each flight segment that exceeds 4 hours, the time weighted average amount of ozone must be less than 0.1 ppmv.

To meet the FAA requirements, aircraft are equipped with catalytic devices that remove ozone from the environment. These converters ensure that oxygen and ozone concentrations are below the regulations even under a worse-case scenario. Catalytic ozone converters in most cases control the oxygen or ozone concentrations by oxidizing the unwanted gas. They typically consist of a metal housing for a precious metal catalyst, which is selected based upon the type of gas to be removed.

Current ozone converters, however, can also produce negative ramifications. In some converters using thermal decomposition, the energy used is so extensive that any fuel savings from altitude adjustment is rendered useless. The accumulation of particles on the adsorbent surface of the converter also decreases the efficiency of carbon adsorption filters, which leads to costly filter maintenance or replacement. Reactors in non-thermal plasma oxidation can contain ozone itself; therefore, a compromise between the required electrical power and the $O_3$ generated must be reached. Also, if the VOCs are neither hydrogen- or carbon-based, non-thermal plasma oxidation may produce toxic substances, such as hydrochloric acid.

Ozone also corrodes various plastics and rubbers that are used on an aircraft. One critical component that is affected by the presence of ozone is the aircraft's air separation module ("ASM"). An air separation module separates atmospheric air into its primary components, typically nitrogen and oxygen, and in some cases argon and other rare inert gases. Membrane gas separation is used to provide oxygen poor and nitrogen rich gas instead of air to fill the fuel tanks of aircraft, thus greatly reducing the chances of accidental combustion in the fuel system. That is, to prevent the combustion of flammable materials unavoidably trapped in a fuel tank, a chemically non-reactive or "inert" gas, such as nitrogen, in introduced into the tank of the aircraft to force out the possibly reactive oxygen gas. As is well known, there are three elements that are required to initiate and sustain combustion: an ignition source (heat), fuel and oxygen. Combustion may be prevented by reducing any one of these three elements. If the presence of an ignition source cannot be prevented within an aircraft's fuel tank, then the tank may be made inert by: 1) reducing the oxygen concentration of the ullage (the space above a liquid fuel) to below that capable of combustion (the combustion threshold); 2) reducing the fuel concentration of the ullage to below the "lower explosive limit" (LEL), the minimum concentration capable combustion; or 3) increasing the fuel concentration to above the "upper explosive limit" (UEL), the maximum concentration capable of combustion.

Thus, as stated above, flammable vapors in fuel tanks are rendered inert by replacing the air, which may contain increased levels of ozone, in the tank with an inert gas, such as nitrogen, nitrogen enriched air, steam or carbon dioxide. This reduces the oxygen concentration of the ullage to below the combustion threshold. Alternate methods based on reducing the ullage fuel-air ratio to below the LFL or increasing the fuel-air ratio to above the UFL have also been proposed. Conversely, membrane gas separation is currently used to provide oxygen enriched air to pilots flying at great altitudes in aircraft without pressurized cabins.

Air separation modules that are needed to accomplish this gas exchange are made from a specialized plastic membrane which breaks down when exposed to ozone. The function of the ASM membrane is to remove the $O_2$ oxygen from the air and leave the $N_2$ "nitrogen rich" air which is essentially inert to be pumped into A/C fuel tanks. The ASM, and particularly the membrane, are a very expensive components, and when the membrane fails then elevated concentrations of $O_2$ pass through, making ASM exit air less inert or more $O_2$ rich, compromising the safety or inertness of the fuel tanks.

Airplane bleed airflow is a source of air used on most commercial aircraft. Bleed air typically can reach temperatures of 450° F., which creates several problems on this issue. One is the higher temperature leads to conversion of $O_2$ to $O_3$ and vice versa in the airflow. Thus, to more safely inert the system both $O_2$ and $O_3$ must be accounted for.

The airline industry has been looking for a high efficiency and a longer lifespan ozone converter to protect the expensive air separation modules. A solution must increase the efficiency of the existing ozone converters and account for the presence of both $O_2$ to $O_3$. The present invention is designed for this very purpose.

SUMMARY OF THE INVENTION

The present invention is a dual core ozone converter that increases the efficiency and performance over existing ozone converters by effectively doubling the reactive surface area for removing ozone. Increased performance is accomplished through the geometrical spacing and the re-mixing of air exiting the first core and entering the second core. Testing confirms that the mixing is essential to improved efficiency.

The dual core ozone converter acts like separate filters to remove unwanted gases. The two converters are installed in series separated by a selected distance, and the first core removes a high percentage of the contamination of the incoming air while the second core removes the residual contamination uncollected from the 1st core. In the present invention, the conversion/exchange between $O_3$ ozone molecules and $O_2$ Oxygen molecules are occurring continually in the atmosphere, aided by ultraviolet light and other chemicals in the atmosphere acting as a catalyst for this reaction. In the ozone converter, the cores are coated with chemical compounds that, when combined with elevated temperatures of the bleed airflow (in lieu of ultraviolet light), become the catalyst of $O_3$ to $O_2$ conversion. The conversion takes place when the $O_3$ is in intimate contact with the chemical coating. The extracted free O atom combines with another free O atom to form an $O_2$ molecule, thus reducing the concentration of $O_3$ Ozone and increasing the concentration of $O_2$ (albeit small) of the exit air. The $O_3$ conversion of $O_2$+O does not require a contribution from the catalytic surface, and thus the coating can operate for longer periods without wearing out or requiring replenishment since there is no depletion/consumption of the chemical compound in this process.

The space between the dual cores of the ozone converter plays a role in the effectiveness of the ozone removal. It is beneficial before entering the second core that adequate mixing and re-constituting of air at the exit of the first core, or at the entrance of the second core, is impactful. The flow pattern of exit air from the first core tends to be streamlined or uni-directional. The "present invention is configured to maximize the re-mixing of the first core exit air and within a short distance to allow the leftover $O_3$ ozone molecules to enter the second core with as much turbulence as possible. The turbulence ensures that a higher percentage of the remaining $O_3$ molecules hit or come in contact with the coated second core.

These and other features of the present invention will become apparent in view of the detailed description of the preferred embodiments in conjunction with the associated figures.

DETAILED DESCRIPTION OF THE PREFERRED EMBODIMENTS

Figure 1:
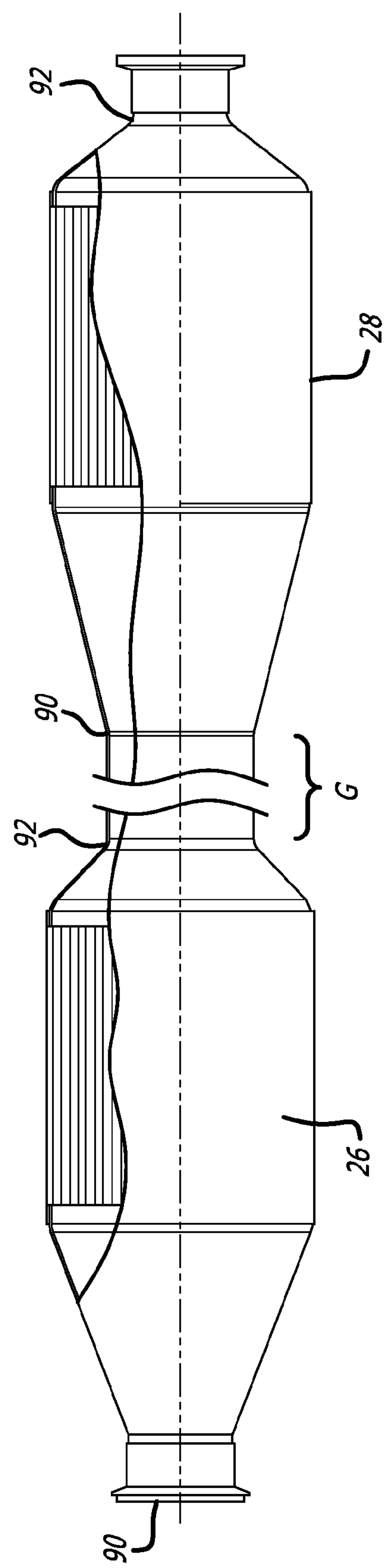
FIG. 1 is a side view, partially cut away, of a first preferred embodiment of the dual core ozone converter.

The configuration of the present invention offers substantial improvement of performance to the Fuel Tank Inerting Systems (FTIS) in modern aircraft over existing ozone converters. The FTIS concept removes oxygen from ambient air and pumps the remaining nitrogen rich air into the aircraft's fuel tanks to inert the environment and prevent fires or explosions in the event a spark source is present within the tank. The use of FTIS is now an FAA mandated requirement in almost all modern commercial and business aircraft.

The key element to removing the oxygen is a plastic membrane residing within the air separation module. Naturally occurring ozone attacks the ASM plastic membrane and causes significant damage to the point where the membrane becomes ineffective. The ASM is an expensive component, and thus the industry is using an ozone converter to minimize/eliminate the ozone from entering the ASM. The ozone converter of the present invention comprises a stainless honeycomb-like core which is treated with a special coating that converts the ozone molecules to Oxygen molecules.

The present invention has undergone significant testing to establish the improved efficiency over existing ozone converters. In a first test of the present invention, a dual core ozone converter arranged in series was used for evaluation. Each core was initially tested individually and separately for efficiencies. FIG. 4 illustrates a test set up for evaluating the dual core ozone converter. A conduit 10 having an airflow at P1 with a temperature sensor 20 is passed through a valve and exits the valve at P2 through a second conduit 12. A heater 14 heats the airflow at P2 to a temperature of 400°, and an oxygen supply 16 feeds an ozone generator 18 that converts $O_2$ to $O_3$, which is introduced into conduit 12 upstream of the ozone converter at the elevated temperature and pressure P3. A temperature sensor 22 measures the temperature of the heated, pressurized gas at the entrance to the ozone converter. The ozone converter 24 includes a first core 26 and a second core 28 separated by a gap G. The gap G was evaluated at 2, 12, 24, and 48 inches to determine the optimal spacing between the cores for promoting mixture of the $O_3$ after exiting the first core 26. The exhaust gas was vented to the atmosphere through conduit 32, and an ozone monitor 30 measured the concentration of ozone before and after the ozone converter 24.

The inlet air temperature was stabilized at the test temperature and then the ozone was injected into the air stream at the same concentrations used to test the individual cores in the previous tests. Ozone concentration was measured at four specific locations, namely core 26 inlet, core 26 outlet, core 28 inlet, and core 28 outlet, at forty seconds intervals for a minimum of 30 minutes. The air pressure was 30 psig, and the ozone concentrations varied from 80 ppm to 145 ppm. At the minimum distance, the efficiency of the dual core system was 99.9%, significantly improving the theoretical value of the combination of the two individual cores. Increasing the gap G to twelve inches further improved the efficiency, whereas further increases in the gap G did not yield appreciable improvement over the twelve inch gap results. The testing shows that a better than expected efficiency is achieved by a gap of twelve inches between cores of the dual core ozone converter.

Figure 3:
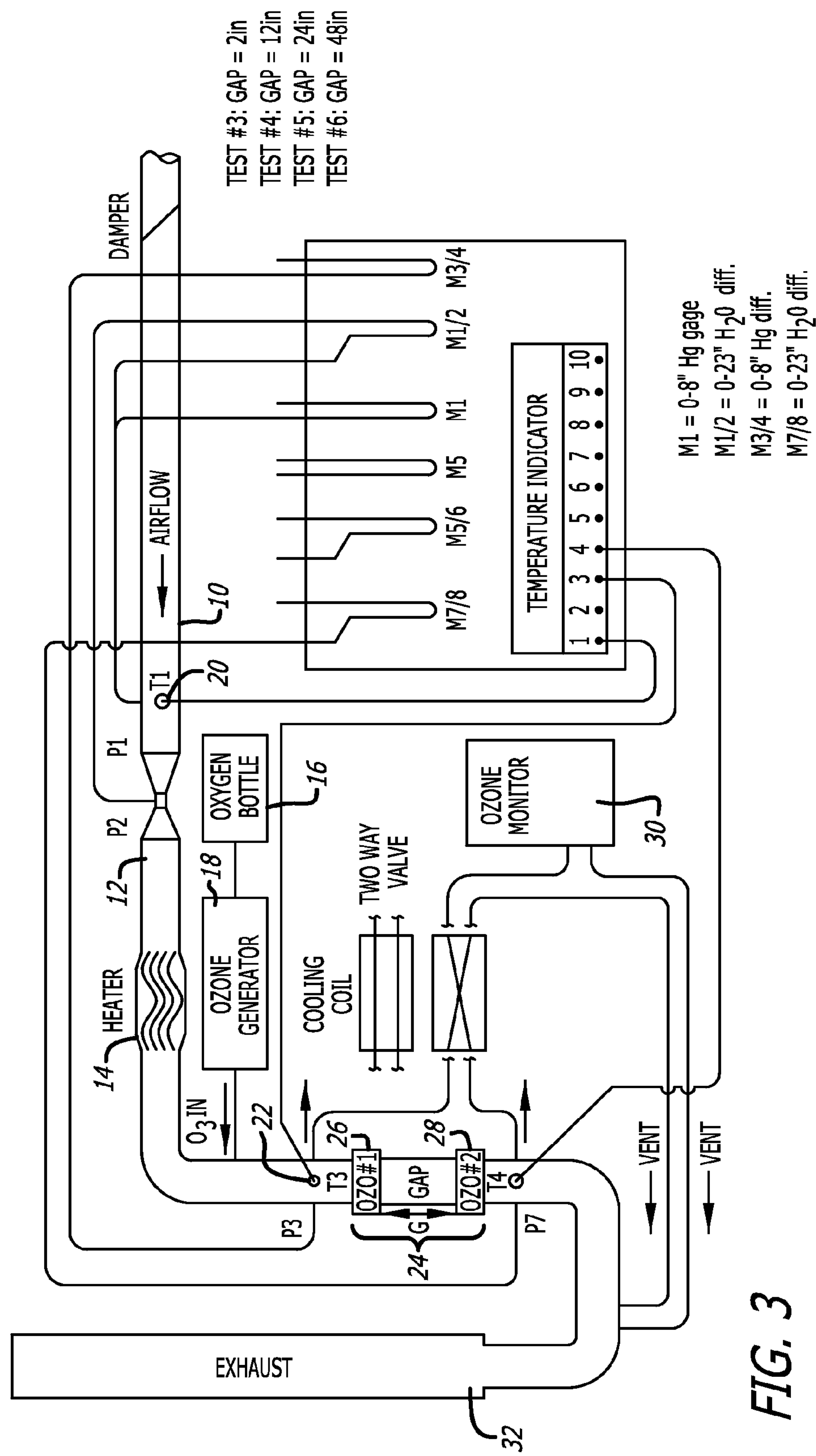
FIG. 3 is a schematic of a test set-up for evaluating the dual core ozone converter.

FIG. 3 illustrates a typical aircraft bleed system for use with the present invention. Bleed airflow 40 is introduced to a shut-off valve 42, controlled by the system control 44. The dual core ozone converter 24 is coupled to the shut-off valve 42, and airflow through the ozone converter is delivered to a heat exchanger 46, which discharges part of the flow as cooling flow and oxygen exhaust overboard gases 48. The temperature is monitored and controlled by a ram cooling flow generated at the generator 50, adjusted through the flow control valve 52 by the system control 44. The cooled ozone free gas exiting the heat exchanger 46 is filtered at filter 56, as the temperature is measured at sensor 54 as part of the feedback loop controlled by the system control 44. Filtered air is fed through the air separation module ASM 60, which separates the oxygen from the inert gases in the air such as nitrogen and argon. The inert gases are moved to the fuel tank 62, controlled by a high flow descent control valve 66 operated by the system control 44. A test port 68 can be used to evaluate the system, and the status of the system is determined by the system control 44 and output to an indicator/display 70.

Figure 2:
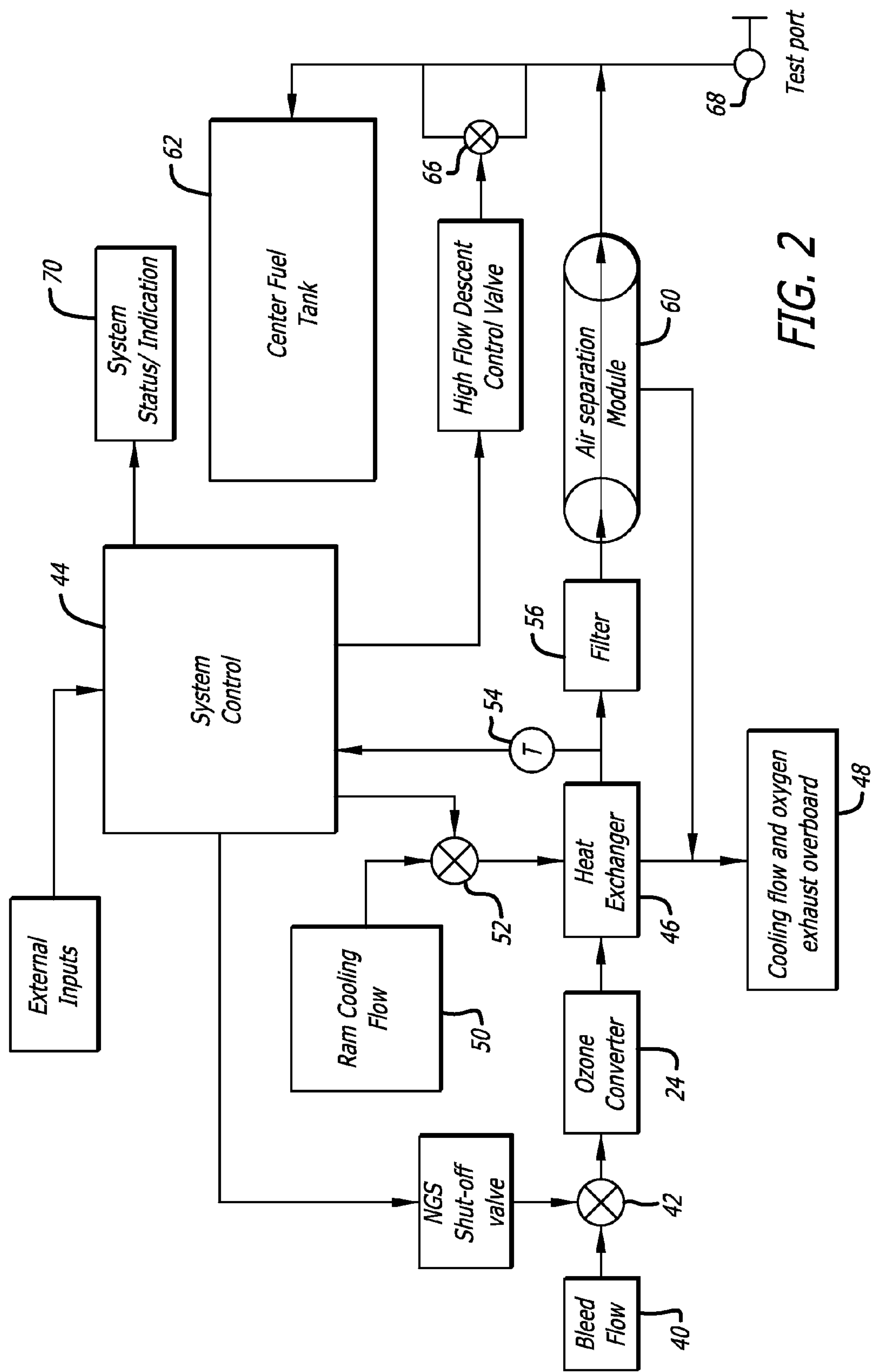
FIG. 2 is a schematic of a bleed airflow system for an aircraft.

FIGS. 1 and 2 illustrate a core 26,28 of the dual core system. In most situations, the first and second cores 26,28 will be identical in construction. The core comprises an inlet 90 and an outlet 92 that can be connected downstream of the shut-off valve 42. The core 26,28 includes an expansion portion 94 and a convergent portion 96, and a constant diameter portion 98 therebetween. The constant diameter portion contains tubes that receive the airflow, where the tubes are coated with a material that reacts with the $O_3$ molecules and causes the following reaction:

$$2O_3 \rightarrow 3O_2$$

Thus, the stream of air exiting the first core 26 has a significantly reduced concentration of ozone as compared with the air entering the first core. A second core 28 is connected to the first core, separated by a gap G that is greater than two inches and preferably twelve inches or more. The second core 28 receives the airflow from the first core, and the remaining ozone in the airflow is removed in the second core to an efficiency of over 99%. The flow exiting the second core 28 is communicated to the air separation module ASM, which can now separate the air into $O_2$ and nitrogen/argon/helium without the need for a separate ozone removal step.

The twin core ozone converter is significantly more efficient and more effective than existing ozone converters, and the efficiency is greater than the theoretical efficiency of the combination of the individual cores. The gap G plays a role in improving the mixing of the stream to further enhance the removal of the stray ozone molecules escaping the first core.

We claim:

1. A system for removing oxygen molecules and ozone molecules from an airstream, comprising:

a dual core ozone converter having a first entrance, a first expanding section, a first ozone removing section, a first converging section, a first exit, a spacer defining a gap G separating the first exit and a second entrance, the second entrance, a second expanding section, a second ozone removing section, a second converging section, and a second exit; and an air separation module for extracting oxygen molecules ($O_2$) from the airstream;

wherein the dual core ozone converter increases the oxygen concentration by removing the ozone present in the airstream, and the air separation module extracts the oxygen from the airflow exiting the dual core ozone converter.

2. The system for removing oxygen molecules of claim 1, wherein the gap G is greater than two inches.

3. The system for removing oxygen molecules of claim 1, wherein the gap G is greater than twelve inches.

4. The system for removing oxygen molecules of claim 1, wherein an efficiency for removing ozone molecules in the dual core ozone converter is over ninety-nine percent (99%).

5. The system for removing oxygen molecules of claim 1, wherein the first and second converging sections are shorter than the first and second expanding sections.

* * * * *